(12) United States Patent
Nagasaka et al.

(10) Patent No.: US 7,005,246 B2
(45) Date of Patent: Feb. 28, 2006

(54) MANUFACTURING METHOD OF MICROSTRUCTURE, MANUFACTURING METHOD AND MANUFACTURING DEVICE OF ELECTRONIC DEVICE

(75) Inventors: Kimio Nagasaka, Nirasaki (JP); Akira Miyamae, Fujimi-machi (JP); Hiroyasu Kaseya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 404 days.

(21) Appl. No.: 10/096,844

(22) Filed: Mar. 14, 2002

(65) Prior Publication Data

US 2002/0135847 A1 Sep. 26, 2002

(30) Foreign Application Priority Data

Mar. 22, 2001 (JP) .............................. 2001-083336
Aug. 10, 2001 (JP) .............................. 2001-244434
Feb. 28, 2002 (JP) .............................. 2002-054571

(51) Int. Cl.
*G11B 7/24* (2006.01)
*G03C 5/00* (2006.01)

(52) U.S. Cl. ................ 430/321; 369/275.1; 369/275.4; 369/277

(58) Field of Classification Search ................ 430/321; 369/275.1, 275.4, 277
See application file for complete search history.

(56) References Cited

U.S. PATENT DOCUMENTS 4,496,216 A * 1/1985 Cowan ....................... 359/566
6,483,639 B1 * 11/2002 Fujinoki et al. ............. 359/355
6,633,434 B1 * 10/2003 Hollander ................... 359/618

* cited by examiner

*Primary Examiner*—Thorl Chea
(74) *Attorney, Agent, or Firm*—Oliff & Berridge, PLC

(57) ABSTRACT

Minute structures are obtained by exposing a process target material and changing the shape thereof by relatively shifting a laser beam or electron beam against the process target material and simultaneously repeating irradiation in an intermittent manner. A plurality of minute convex or concave shapes are formed on the process target material by employing a branching element for branching a single beam into a plurality of beams; a parallel element for converting said plurality of beams into beams which respectively advance in parallel; and a condensing element for condensing the plurality of beams to the process target material and generating a plurality of minute spots thereon.

10 Claims, 20 Drawing Sheets

(a)

SECOND SHOT

① ②    ① ②

① ②    ① ②

NINTH SHOT

① ② ③ ④ ⑤ ⑥ ⑦ ⑧ ⑨ ⑦ ⑧ ⑨

① ② ③ ④ ⑤ ⑥ ⑦ ⑧ ⑨ ⑦ ⑧ ⑨

(b) THIRD ROUND

MANUFACTURING METHOD OF MICROSTRUCTURE, MANUFACTURING METHOD AND MANUFACTURING DEVICE OF ELECTRONIC DEVICE

BACKGROUND OF THE INVENTION

1. Field of the Invention

The present invention relates to the manufacturing method of optical elements and other microstructures having an antireflective effect which are employed in display devices, imaging devices or illumination devices; and the manufacturing method of optical devices and electronic devices such as display devices, imaging devices, information storage devices, optical communication devices, optical information processing devices, and so on comprising such microstructure.

2. Description of the Related Art

The surface of a liquid crystal display device is ordinarily protected with a flat transparent plate such as glass. Since this flat plate has a reflectivity of approximately 4% in general, it reflects the peripheral illuminate light, and thereby deteriorates the display quality by overlapping with the image formed with the liquid crystal. Particularly in cases of being illuminated outside by sunlight, the amount of reflected light becomes great due to the flat plate, and there are cases where the image of the liquid crystal cannot be viewed. As a means of resolving this problem, there are those that alleviate the reflectivity on the surface by depositing oxides on the surface of the flat plate and forming an antireflective film thereon.

Meanwhile, as another method of realizing antireflection, it is known that a microstructure (shape) referred to as a moth-eye is effective. The appellation of moth-eye derives from the recognition by natural scientists around 1970 that an eye of a moth has the nature of not reflecting light, and the discovery that, upon observing the surface of the moth's eye with a microscope, conical protrusions having a height of approximately 200 nm are bedded in roughly 200 nm intervals. This structure contributes to the antireflection of light, and it has been discovered that a structural body having a height of approximately 40% of the wavelength is required therefor. This structure does not depend on the angle of incoming radiation of the illuminate light, and has an antireflective effect across a relatively broad wavelength.

When considering the case of forming a moth-eye structure on the photo resist with a laser drawing device, ordinarily, a single laser beam is condensed with an objective lens, one spot is formed thereby, and exposure is conducted by irradiating this a plurality of times while changing positions. This spot size (the diameter of the first dark ring) $d_0$ is represented with $d_0=1.22\lambda/NA$. Here, $\lambda$ is the oscillation wavelength of the laser, and NA is the numerical aperture of the objective lens.

When $\lambda$ is 351 nm and NA is 0.9, $d_0$ is 476 nm. Pursuant to the non-linearity of the photosensitive curve of the photo resist, the width of the convex shape (or concave shape) actually formed is small at approximately 300 nm. This method, however, is insufficient in forming the moth-eye structure. Although $d_0$ can be reduced by shortening the wavelength, there is a problem in that the manufacturing device will become complex and large.

Due to the foregoing reasons, at present, the moth-eye structure is formed by interfering a plurality of broad beams, or by drawing the same with an electronic beam drawing device.

Nevertheless, when forming an antireflective film with deposition for preventing reflection, a large vacuum device will become necessary and the manufacturing cost therefor will increase thereby.

Moreover, since a single layer of antireflective film depends highly on the wavelength, it is difficult to yield the effect of antireflection against the entire wavelength region of visible light. Although an antireflection effect can be yielded against a plurality of wavelengths by providing a multilayer film, the design becomes complex and the number of processes will also increase as a result thereof.

Furthermore, when devising the antireflective film against illuminate light of a specific incidence angle, the effect of antireflection will decrease for illuminate light of other incidence angles.

In addition, when forming the moth-eye structure, the manufacturing method of interfering three broad beams has problems in that, upon forming the structure of a large area, it is difficult to form the beams evenly, and an interference pattern of high contrast cannot be obtained due to the influence of oscillation at the time of exposure. Moreover, when exposing with an electronic beam, the drawing time will be long since a single beam is usually used for the drawing. Further, since an electronic beam exposure device is expensive, the manufacturing cost thereof will become high.

SUMMARY OF THE INVENTION

The present invention was devised in view of the foregoing problems, and an object thereof is provide a manufacturing device capable of obtaining further minute structures.

Moreover, another object of the present invention is to provide a manufacturing method of a microstructure capable of manufacturing, with extreme precision, microstructures such as a moth-eye structure by forming an interference pattern of high contrast.

In addition, a further object of the present invention is to provide a manufacturing method capable of obtaining, with a simple structure, an even microstructure.

In order to achieve the foregoing objects, the manufacturing method of a microstructure according to the present invention is a manufacturing method of exposing a process target material and changing the shape thereof by relatively shifting a laser beam or electronic beam against the process target material and simultaneously repeating irradiation in an intermittent manner, wherein a plurality of minute convex or concave shapes are formed on the process target material by employing branching means for branching a single beam into a plurality of beams; and condensing means for condensing the plurality of beams to the process target material and generating a plurality of minute spots thereon.

According to the foregoing structure, the beams can be branched, and it is thereby possible to form a plurality of spots smaller than the laser wavelength to be used by interfering such beams.

Preferably, parallel means is further provided for converting the plurality of beams into beams which respectively advance in parallel. A plurality of parallel beams can be obtained thereby even upon changing (adjusting) the distance between the branching means and the parallel means, and the burden on the condensing structure or adjustment of the succeeding condensing means (a lens, for example) is alleviated.

Preferably, the branching means for branching a single beam into a plurality of beams is a diffraction grating. It thereby becomes possible to branch a beam relatively easily.

Preferably, the diffraction grating is a phase-type diffraction grating including a plurality of types of phase shift areas having different phase shift quantities against the single beam.

Preferably, when the type of phase shift area is given as Q, the maximum phase difference arising mutually between the beams having passed through different types of phase shift areas is made to be $2\pi(Q-1)/Q$.

Preferably, the diffraction grating is a two-value phase-type diffraction grating including two types of phase shift areas which relatively generate a phase difference of $\pi$ against the beam to be used.

Preferably, each of the two types of phase shift areas includes one area shape among a stripe-patterned shape, quadrangular shape or equilateral triangular shape, and the phase-type diffraction grating comprises a grating pattern where the two types of phase shift areas are disposed alternately such that the same type of phase shift area is not adjacent to each other. Two, four or six beams can be obtained from a single beam pursuant to such phase-type diffraction grating.

Preferably, the diffraction grating is a phase-type diffraction grating including three types of phase shift areas which relatively generate a phase difference of $-\phi, 0, +\phi$ against the beam to be used.

Preferably, each of the three types of phase shift areas has a hexagonal area shape, and the phase-type diffraction grating comprises a faveolate grating pattern where the three types of phase shift areas are disposed alternately such that the same type of phase shift area is not adjacent to each other. Three beams can be obtained by branching a single beam pursuant to such phase grating.

Preferably, the parallel means is a diffraction grating. The beam diagonally entering the diffraction grating can thereby be advanced in a certain angle against the diffraction grating face; for example, in the normal direction of such face.

Preferably, the parallel means is a diffraction grating comprising grating areas having differing grating directions in a number corresponding to the plurality of beams. Moreover, the diffraction grating positions a reference point of a substrate at the center position of the spot pattern formed on the surface of the diffraction grating pursuant to the passage of the plurality of beams, and disposes each grating area in correspondence with the plurality of beams around such reference point. A plurality of beams can be paralleled easily with the foregoing structure.

Preferably, the condensing means is a lens. A spot set can thereby be obtained from a plurality of minute spots since a plurality of beams can be condensed and interfered on a photo resist.

Further, in order to achieve the foregoing objects, the manufacturing method of a microstructure according to the present invention includes: a spot set forming step for obtaining a spot set formed of a plurality of minute spots from a laser beam or an electronic beam; and an exposure step for forming an irradiation trace by irradiating the spot set a plurality of times while changing the irradiation position of the spot set against a process target material; wherein the exposure step performs multilayer exposure by overlapping a part of a plurality of irradiation traces pursuant to a single spot set and a part of a plurality of irradiation traces pursuant to another spot set.

According to the foregoing structure, influence caused by the energy variances of the respective spots in the spot set can be reduced, and the amount of exposure of the irradiation traces can be made even. It also becomes possible to increase the amount of energy (amount of exposure) to the irradiation trace.

In the foregoing manufacturing method, it is desirable that the spot set forming step includes: a branching step for branching a single beam into a plurality of beams; and a condensing step for condensing the plurality of beams to the process target material. Minute spots can be formed thereby.

Further, in the foregoing manufacturing method, it is desirable that the spot set forming step includes: a branching step for branching a single beam into a plurality of beams; a parallel step for making the plurality of beams mutually advance in parallel; and a condensing step for condensing the plurality of beams to the process target material. By adding the parallel step of paralleling a plurality of beams, the subsequent condensation becomes easy.

In the aforementioned manufacturing method, it is desirable that the single spot set and another spot set are spot sets adjacent in the shifting distance of the irradiation position. Multilayer exposure can thereby be performed pursuant to the shifting of the irradiation position.

In the aforementioned manufacturing method, it is desirable that the single spot set and another spot set are spot sets adjacent in the perpendicular direction (or intersecting direction) against the shifting distance of the irradiation position. Multilayer exposure can thereby be performed between the respective rows upon exposing a plurality of rows.

Moreover, the manufacturing method according to the present invention includes: a spot set forming step for obtaining a spot set formed of a plurality of minute spots from a laser beam or an electronic beam; and an exposure step for forming an irradiation trace by irradiating the spot set a plurality of times while changing the irradiation position of the spot set against a process target material; wherein the exposure step performs exposure by forming, between the space of irradiation traces pursuant to a single spot set, an irradiation trace pursuant to another spot set.

In the foregoing manufacturing method, it is desirable that a spiral-shaped irradiation trace pursuant to a plurality of minute spots is formed by relatively shifting the spot set radially while rotating the process target material. Minute exposure processing can be performed thereby at extremely fast speeds.

In the foregoing manufacturing method, it is preferable that the plurality of minute spots are formed by employing a phase-type diffraction grating having a phase shift area (cell) with a striped pattern, quadrangle, equilateral triangle or hexagon as the unit of area. A regular minute spot of a desired pattern can thereby be formed.

Preferably, the process target material is a photosensitive material, and the irradiation trace is a latent image formed on the photosensitive material. The photosensitive material can be developed and used as the microstructure, or as a mask for transcribing the microstructure on the substrate.

Moreover, minute processing (laser ablation) may be performed to the process target material with a laser beam.

The manufacturing method of an electronic device according to the present invention is a manufacturing method of an electronic device comprising a microstructure, wherein the manufacturing process of the microstructure includes: a spot set forming step for obtaining a spot set formed of a plurality of minute spots from a laser beam or an electronic beam; and an exposure step for forming an irradiation trace by irradiating the spot set a plurality of times while changing the irradiation position of the spot set against a process target material; wherein the exposure step performs multilayer exposure by overlapping a part of a plurality of irradiation traces pursuant to a single spot set and a part of a plurality of irradiation traces pursuant to another spot set.

Moreover, manufacturing method of an electronic device according to the present invention is a manufacturing method of an electronic device comprising a microstructure, wherein the manufacturing process of the microstructure includes: a spot set forming step for obtaining a spot set formed of a plurality of minute spots from a laser beam or an electronic beam; and an exposure step for forming an irradiation trace by irradiating the spot set a plurality of times while changing the irradiation position of the spot set against a process target material; wherein the exposure step performs exposure by forming, between the space of irradiation traces pursuant to a single spot set, an irradiation trace pursuant to another spot set.

Each of the foregoing manufacturing methods of a microstructure can be applied to the manufacturing method of optical elements partially or entirely comprising a microstructure. Further, each of the foregoing manufacturing methods of a microstructure can be applied to the manufacturing method of electric optical devices having as one of its components an optical element partially or entirely comprising a microstructure. A moth-eye structure and photonic crystal are included in this optical element.

Moreover, the manufacturing device according to the present invention is a manufacturing device which forms a microstructure by irradiating a laser beam to a process target material, the manufacturing device of a microstructure comprising: a beam source for generating a laser beam; a modulator for intermitting the laser beam; branching means for branching the modulated beam into a plurality of beams; and condensing means for condensing and interfering the plurality of beams in order to generate a plurality of minute spots on the process target material.

Preferably, parallel means is further provided for making the plurality of branched beams to be mutually parallel beams and entering the beams into the condensing means.

Preferably, the parallel means is a blazed diffraction grating which positions a reference point of a substrate at the center position of the spot pattern formed on the surface of the diffraction grating pursuant to the passage of the plurality of beams, and disposes each grating area in correspondence with the plurality of beams around such reference point.

Preferably, the branching means is a phase-type diffraction grating including a plurality of types of phase shift areas having different phase shift quantities against the single beam.

Preferably, when the type of the phase shift area is given as Q, the maximum phase difference arising mutually between the beams which passed through different types of phase shift areas is made to be $2\pi(Q-1)/Q$.

BRIEF DESCRIPTION OF THE DRAWINGS

FIG. 10 is a diagram showing another example of the relationship between the shifting distance and spot interval;

DESCRIPTION OF THE PREFERRED EMBODIMENTS

Embodiments of the present invention are now explained with reference to the drawings.

(1. Structure of Exposure Device)

Figure 1:
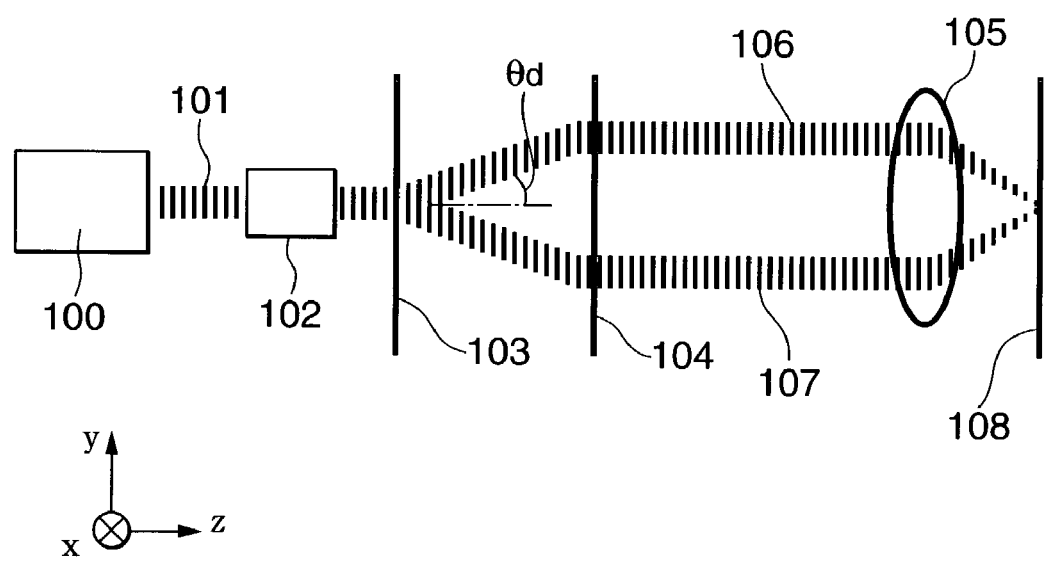
FIG. 1 is a diagram showing the optical system of the laser drawing device employed in an embodiment of the present invention.

FIG. 1 is a diagram showing the optical system of the laser drawing device employed in an embodiment of the present invention. In FIG. 1, a beam 101 oscillated with a gas laser 100 as the beam source advances in the z direction of the diagram and, after having been intermittently modulated with an acousto-optical modulator 102 employing an acousto-optical (AO) element, arrives at a diffraction grating 103. Here, the beam is divided into four beams including beam 106 and beam 107. Thereafter, the four beams are converted into parallel advancing beams at the diffraction grating 104 and entered into an objective lens 105. Here, the four beams are condensed to a single point in order to achieve interference, and a plurality of minute spots of a size smaller than the wavelength are formed on a photo resist layer 108 coated on an original glass plate surface. A latent image is formed on the photo resist layer 108 by shifting the original glass plate with a slider and motor in link with an AO modulator 102. Then, a moth-eye structure can be formed pursuant to development processing.

Figure 2:
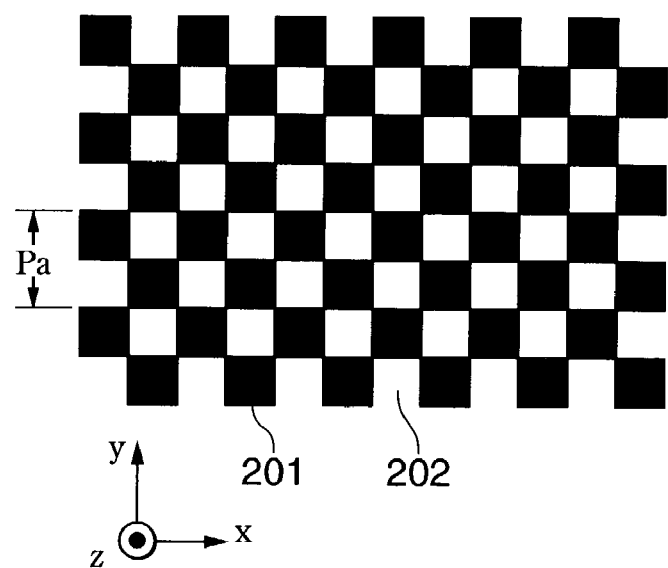
FIG. 2 is a diagram showing the first diffraction grating pattern, which is a structural element of the optical system illustrated in FIG. 1.

The diffraction grating 103 is a phase-type diffraction grating in which concavities and convexities are formed on one side of a transparent parallel flat plate, and the pattern thereof is shown in FIG. 2. This pattern is structured of two areas (phase shift areas) having different levels in the depth direction (z direction), and such areas are respectively represented with the black portion 201 and white portion 202. The beam diffracted with the diffraction grating 103 is branched into four beams. The respective cycles of the patterns in the x direction and y direction are both equal at Pa.

Light transmitted through the black portion 201 and white portion 202 is designed to generate a phase difference of π by differing the optical path length, thereby yielding maximum diffraction efficiency. In reality, the vertical interval ta of the two areas can be represented by the following formula when the optical source wavelength of the gas laser device 100 is given as λ, the refractive index of the material forming the diffraction grating 103 in this wavelength is given as n, and this is placed in the air:

$$ta = \lambda/2(n-1).$$

When the wavelength λ is given as 351 nm and the refractive index n as 1.48, ta=365.6 nm.

When representing the diffractive light as a wave vector, the relationship of the wave vector and angle θd formed by the z axis and cycle Pa when projecting on this yz plane is represented with:

$$Pa = \lambda/\sin \theta d.$$

Figure 3:
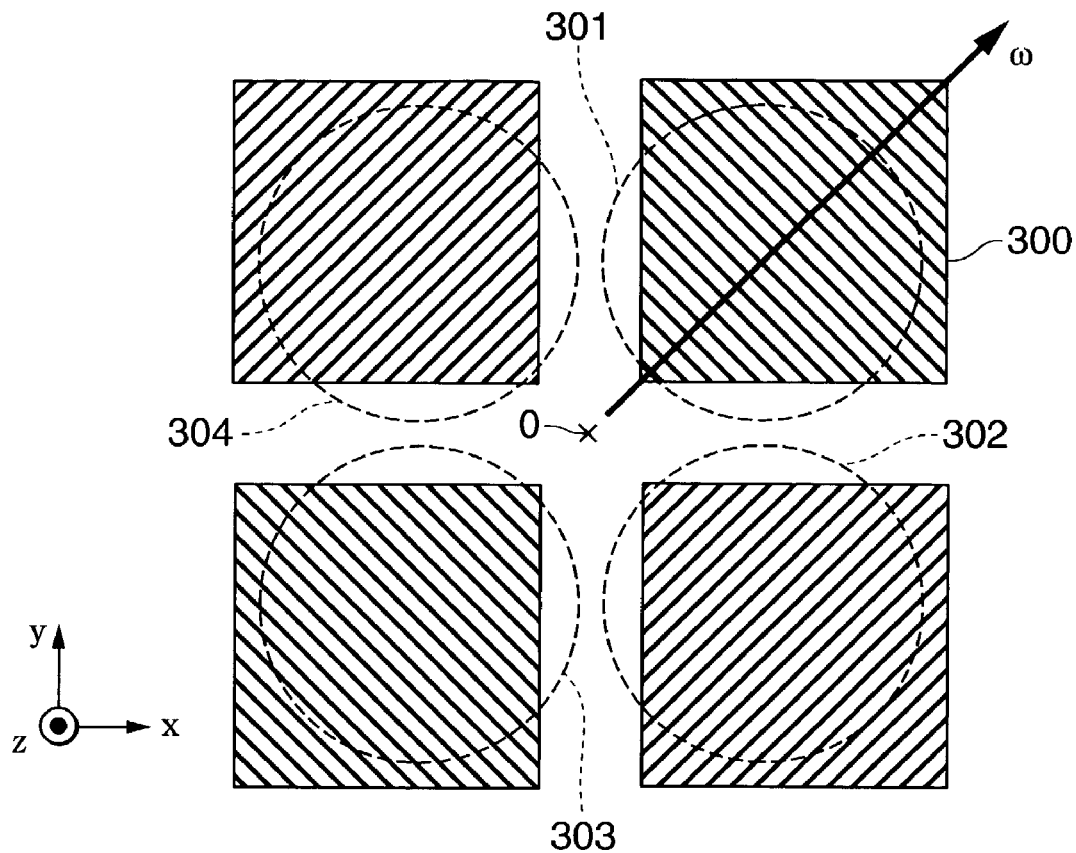
FIG. 3 is a diagram showing the second diffraction grating pattern, which is a structural element of the optical system illustrated in FIG. 1.

As shown in FIG. 3, the four beams obtained by being diffracted and branched with the diffraction grating 103 respectively enter into the positions of spots 301, 302, 303, 304 on the face of the diffraction grating 104. The center position of these spot patterns coincides with the center position (reference point) O of the diffraction grating. The respective areas of the diffraction grating corresponding to the four beams are disposed around this center O. Here, the beams entering into spot 301 and spot 303 are of the same phase, and the beams entering into spot 302 and spot 304 are of the same phase. Moreover, the phase difference of the respective beams of spot 301 and spot 302 and the phase difference of the respective beams of spot 303 and spot 304 are π, respectively.

The diffraction grating 104 is a phase-type diffraction grating in which concavities and convexities are formed on one side of a parallel flat plate, and this pattern is structured from four grating areas including the grating area 300.

Figure 4:
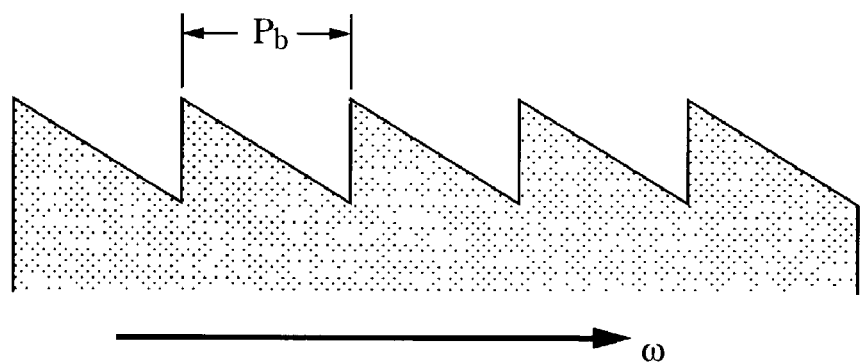
FIG. 4 is a cross section of the third diffraction grating.

As shown in FIG. 4, the cross section in the axial ω direction of the grating area 300 is a saw shape. The depth tb of this saw shape yields the maximum diffraction efficiency when the refractive index of the material forming the diffraction grating 104 is given as n, and when $$tb = \lambda/(n-1).$$

When the wavelength λ is given as 351 nm and the refractive index n as 1.48, tb=731 nm.

Figure 6:
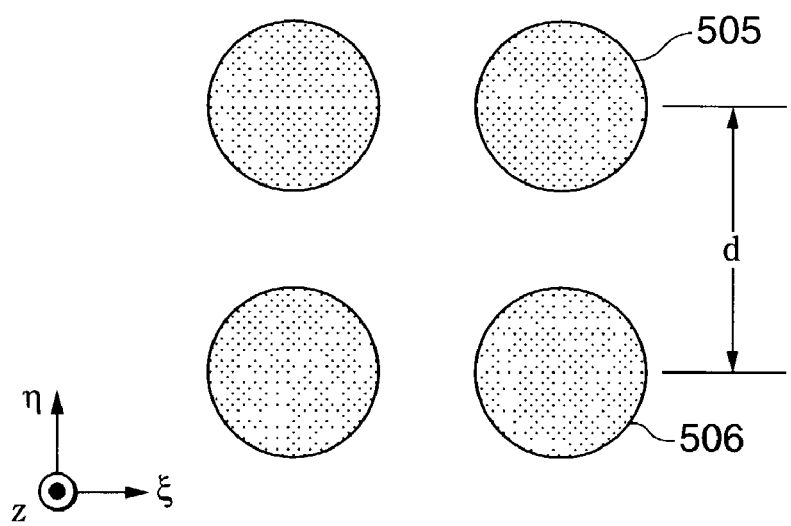
FIG. 6 is diagram showing the layout of the spots formed on the photo resist face.

Further, when cycle Pb of the saw shape is:

$$Pb = Pa/(\sqrt{2}),$$

the four beams including the diffracted beams 106, 107 are all advancing mutually in parallel. These four beams are condensed with an objective lens 105 and interfered at the photo resist layer 108, whereby formed are four minute spots (spot sets) including the spots 505, 506 shown in FIG. 6.

Although the mutual interval d of these minute spots can be properly sought by conducting Fourier transformation to the complex amplitude immediately after the transmission of the diffraction grating 104, a simplified method is described below.

Figure 5:
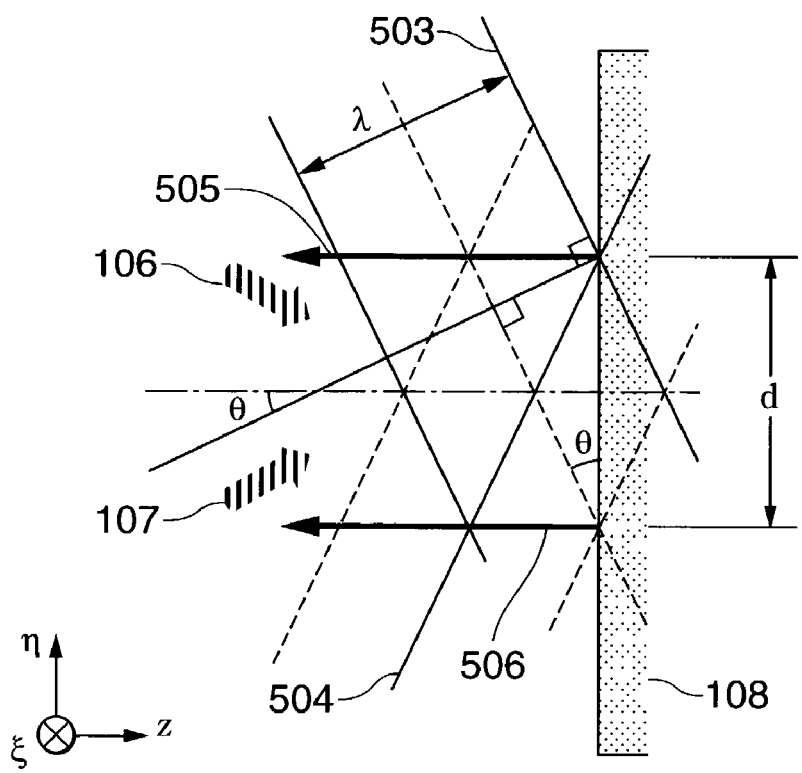
FIG. 5 is a diagram explaining the spot intervals formed on the photo resist face.

As shown in FIG. 5, a Fourier space of the complex amplitude immediately after the transmission through the diffraction grating 104 is formed on the surface of the photo resist layer 108, and this coordinate is represented with the ξ axis and η axis. These axes are spatially parallel to the x axis and y axis, respectively. Beam 106 and beam 107 connect the focal point on the surface of the photo resist layer 108. The wavefront becomes flat near the focal point, and the respective beams form wavefront 503 and wavefront 504. Two wavefronts constantly reinforce each other at the positions of spots 505, 506 in the surface of the resist layer 108. Meanwhile, these two wavefronts constantly weaken each other at the center point of spots 505, 506, and the exposure intensity becomes zero. When the angle (incidence angle) formed by the advancing direction of beam 106 and beam 107 and the normal line of the photo resist layer 108 is given as θ, the beam interval d is represented by:

$$d = \lambda/2 \sin \theta.$$

For example, when the oscillation wavelength λ of the laser device 100 is given as 351 nm and the incidence angle of beams 106, 107 is 50 degrees, respectively, the beam interval d becomes 229 nm.

Moreover, when the beam interval d is represented upon employing NA:

$$d = (\lambda/2)/NA.$$

For example, when the oscillation wavelength λ of the laser device 100 is given as 351 nm and the object lens NA is 0.59, d becomes 300 nm.

A latent image is formed by irradiating a laser pulse in an interval twice that of d, for example, in both directions of ξ and η, on the surface of the photo resist 108 at the four spots including spots 505, 506. This is developed in order to form convex or concave shapes on the photo resist 108. An antireflection effect can thereby be obtained in an approximate visible region. Thereafter, the shape of the photo resist 108 is transcribed onto a quartz substrate with etching processing. Or, an antireflective plate can be mass produced by plating the surface of the photo resist 108 and manufacturing a mold of the same shape, and forming a resin from such mold.

In this embodiment, although the irradiated light effective in antireflection was visible light, the θ may be adjusted for compliance with the demanded wavelength band. Further, although two types of diffraction gratings were made to be parallel and flat, the present invention is not limited thereto, and two types of diffraction gratings may be formed on both sides of a single parallel flat plate.

As described above, since a beam is branched into a plurality of branches with the diffraction grating, a plurality of spots, which are smaller than the laser wavelength to be used, can be formed through the interference of such beams. A microstructure moth-eye can thereby be easily formed.

Next, an embodiment of another invention according to the present application is described below.

In the foregoing embodiment, a plurality of minute spots are generated by branching a single beam and condensing a plurality of beams having a relative phase difference of π. With this branching of the beam, a two-value phase-type diffraction grating separates the beam into a plurality of beams, and these plurality of beams are made parallel with a saw-shaped diffraction grating.

Here, the precision of beam separation will depend on the precision of the diffraction grating, and since the diffraction grating itself is a microstructure, it is not so easy to prepare this with high precision. It is further difficult to separate the amount of light of each beam evenly, and the size of each of the plurality of minute spots often vary upon re-condensing the beams with an objective lens. Moreover, the mounting position precision of the diffraction grating; that is, the accuracy of the spot position on the diffraction grating, largely influences the phase of the respective beams. Each of the minute spots becomes uneven if the phase difference between the respective beams is not of a prescribed value. As a result of the above, the protrusion shape of the moth-eye structure becomes uneven, and the performance of the antireflection effect may deteriorate partially, or even entirely.

Further, the interval between the protrusions in a moth-eye structure is determined by the mutual interval of the spots in the minute spot set, and this is determined with the interval of the separated beam and the numerical aperture NA of the lens. It is complicated to replace the objective lens mounted on the device, and this cannot be conducted frequently. Thus, the interval of the plurality of beams (interval of minute spots) requires the adjustment of beams on a case-by-case basis by changing the distance of the aforementioned two diffraction gratings 103, 104.

Accordingly, the invention described below forms the aforementioned microstructure more evenly, and provides a manufacturing method capable of obtaining an even microstructure with a relatively simple structure.

Figure 7:
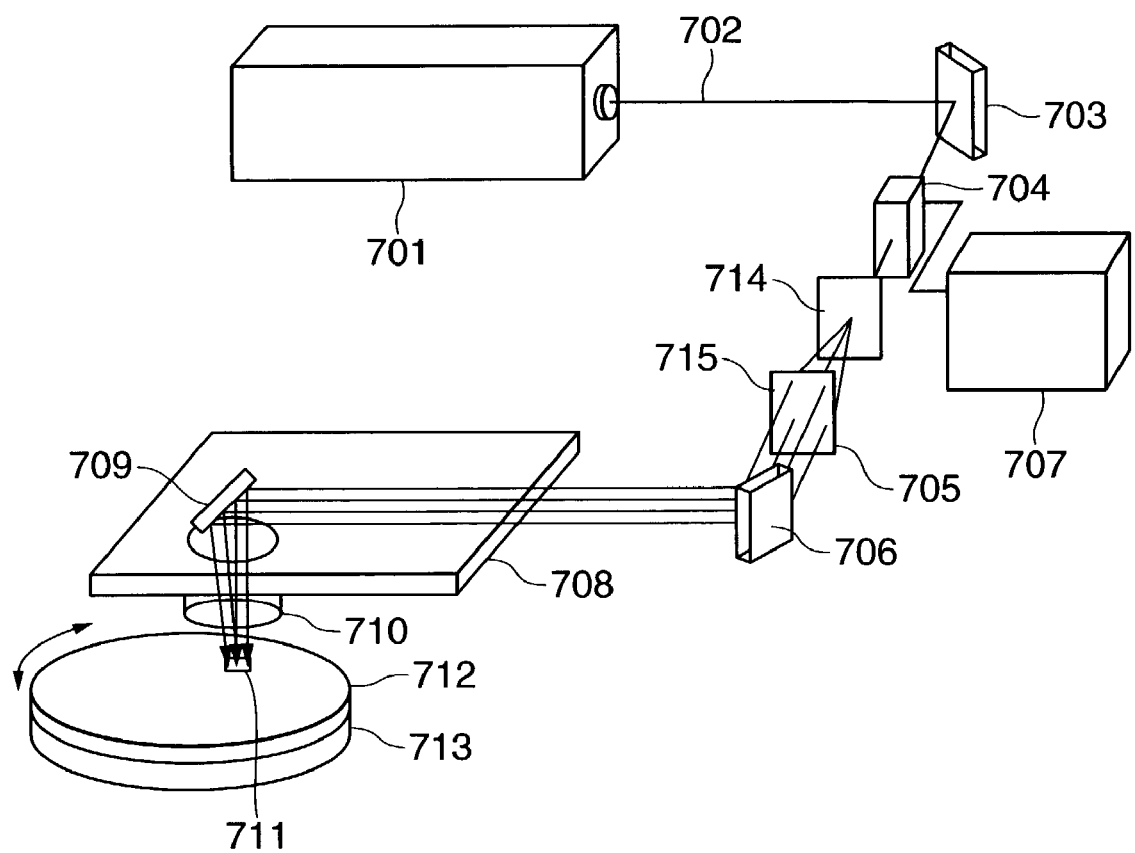
FIG. 7 is a specific optical path diagram of the aforementioned laser drawing device.

FIG. 7 is a diagram explaining the manufacturing device of the microfabrication realized with the laser drawing device (exposure device) illustrated in FIG. 1.

As shown in the diagram, the beam 702 which exited the laser generation device 701 having a wavelength of 351 nm is reflected at the mirror 703, enters the acousto-optical modulator (AOM) 704, and the intensity thereof is modulated. A checkerboard-patterned diffraction grating 714 having a pattern cycle Pa=18 μm and a saw-shaped diffraction grating 714 having a pattern cycle Pa=12.7 μm are disposed after the AOM 704, and the beam is parallel separated into four beams. The mutual distance between the diffraction gratings is 4.5 mm. The parallel separated four beams are reflected at mirrors 706, 709, condensed at the objective lens 710 having a numerical aperture of 0.9, and a minute spot is thereby formed on the original glass plate to which a photo resist has been applied thereon. Here, in order to enter the separated four beams into the objective lens in consideration of the beam diameter, the effective NA becomes approximately 0.6, and the spot interval becomes 0.3 μm. The original glass plate 712 is adsorbed to the turntable 713, and the objective lens 710 and mirror 709 are mounted on the movable optical bench 708 and moves radially together with the rotation of the turntable. A latent image is formed by exposing the photo resist layer applied to the original glass plate 712 upon setting the rotation speed of the turntable 713 as 1 m/s, sliding the movable optical bench 708 such that the track pitch becomes 0.6 μm, and modulating the beam at a rectangular pulse of 1.67 MHz with the AOM 704.

Figure 8:
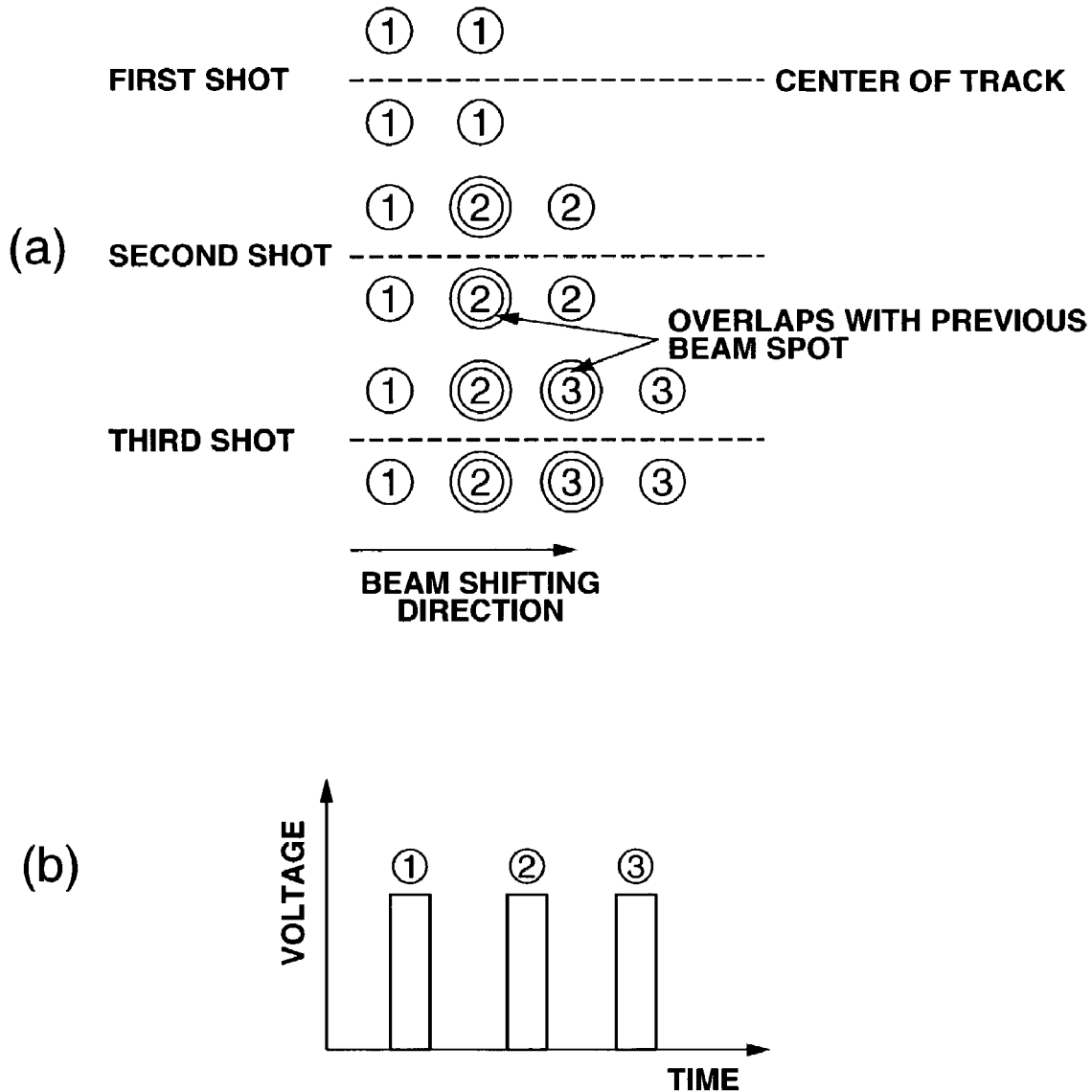
FIG. 8(a) is a diagram showing an example of multilayer exposure, whereby
FIG. 8(b) is a diagram showing the modulation signal therefor.

As shown in FIG. 8, upon this exposure, the beam is modulated with the AOM 704 such that a part of the spot set is multilayer exposed by overlapping with a part of an adjacent spot set. In other words, the shifting distance of each shot is made to be equal to the spot interval, or 0.3 μm.

Foremost, as shown with "1" in FIG. 8(a), four spot sets of the first shot are exposed across the center of the track scanning the original plate. Next, with the second shot which shifted 0.3 μm toward the track, among the four spots shown with "2", the two spots on the left are exposed so as to overlap with the two spots on the right of the first shot. Further, with the third shot, among the four spots shown with "3", the two spots on the right of the second shot are exposed so as to overlap with the two spots on the left of the third shot. In the diagram, the number of the spots represented with a double circle is the portion of multilayer exposure. This type of multilayer exposure is repeated in the required area on the original plate.

As described above, by performing multilayer exposure, it becomes possible to average the variances of the amount of light of the respective spots in a single spot set in the multilayer direction (shifting distance of the spot set).

Figure 12:
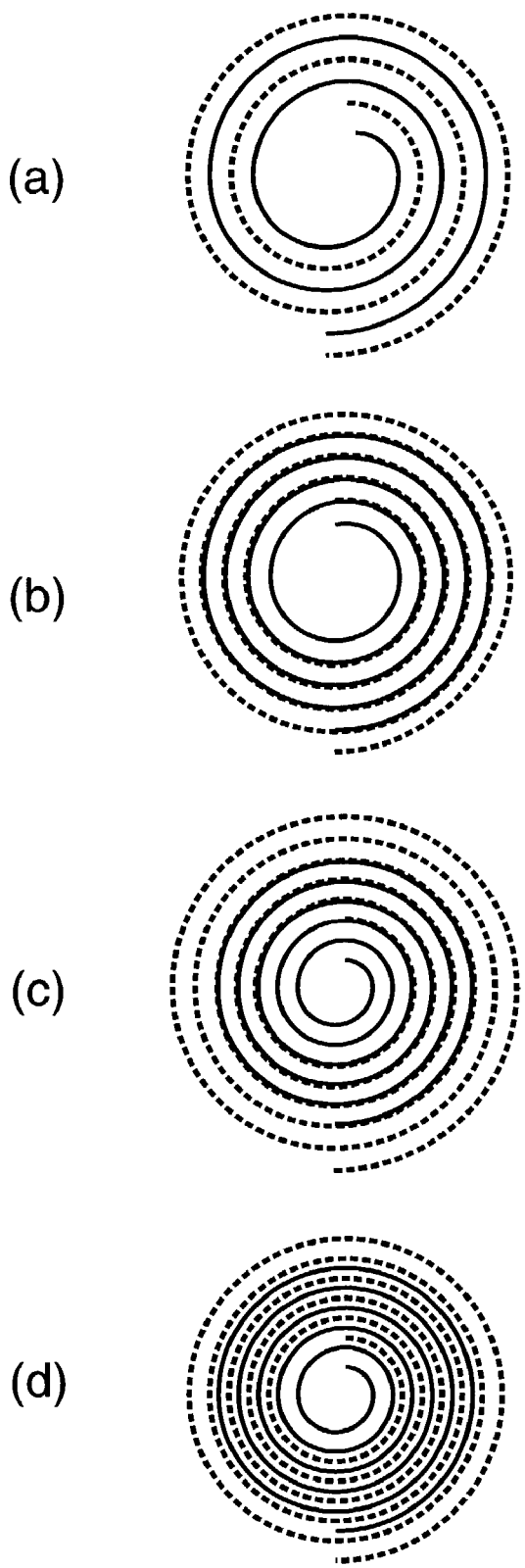
FIG. 12 is a diagram showing various modes of the spiral.

FIG. 12 is a diagram explaining the relationship of the track pitch setting in the diameter direction and the spot set multilayering.

As shown in FIG. 12(a), when the shifting distance of the diameter direction (track pitch) per rotation of the original plate is twice the spot interval in the diameter direction of the spot set, the four spots will not overlap in the diameter direction of the spiral scan, and becomes the two spirals shown with the solid line and dotted line illustrated in the diagram. Moreover, the solid line shows the trace pursuant to the two spots on the inside of the diameter direction among the spot sets. Further, the dotted line shows the trace pursuant to the two spots on the outside of the diameter direction among the spot sets.

FIG. 12(b) is a diagram showing that multilayer exposure is possible not only in the peripheral direction, but also in the diameter direction, upon making the spot set track pitch the same as the spot interval, or 0.3 μm. Thereby, excluding the innermost periphery and outermost periphery, the exposure trace appears to be a single spiral.

Figure 9:
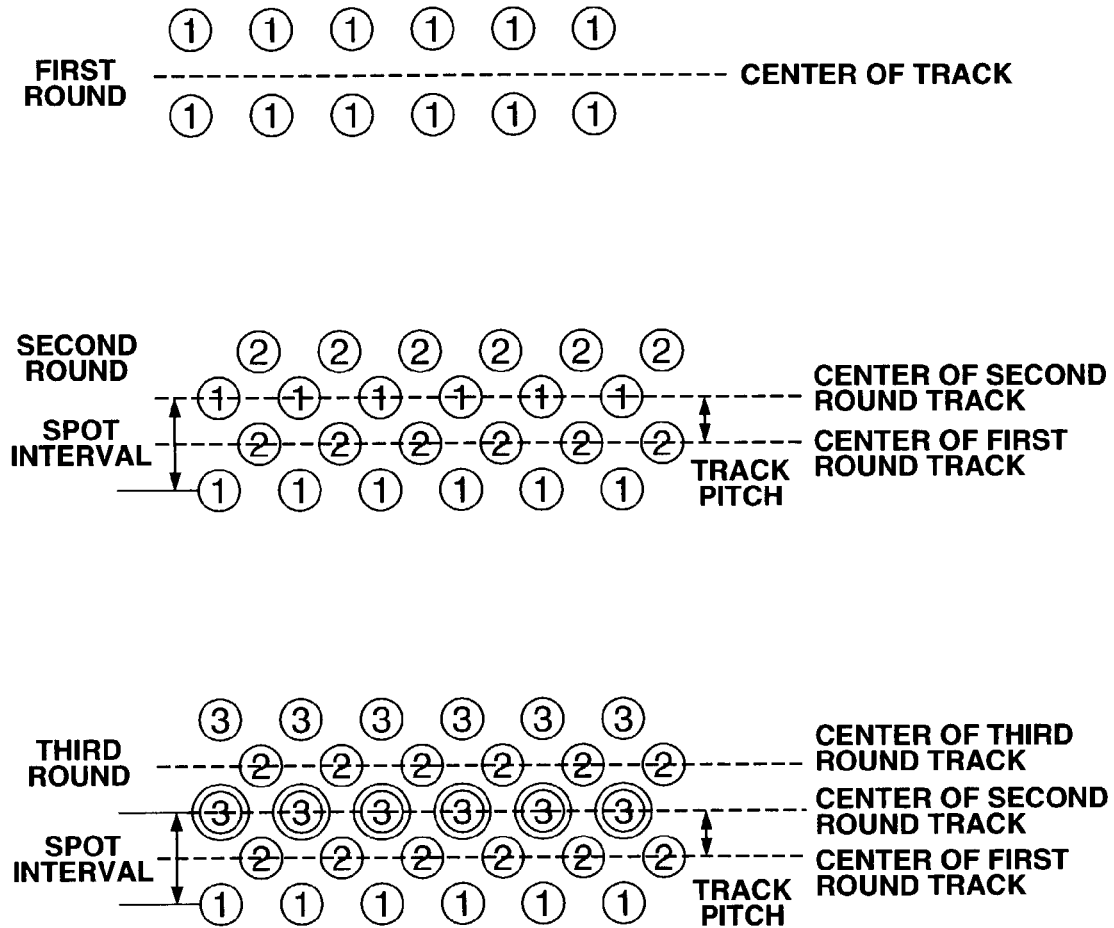
FIG. 9 is a diagram showing an example of the exposure method for obtaining a minute structure.

FIG. 12(c) is a diagram showing an example of setting the track pitch to half the spot interval of the spot set, or 0.15 μm. As shown in FIG. 9, by conducting exposure such that the first round spot goes between the spot of the second round track, the interval of the exposed spots can be narrowed. When exposure is performed as described above, it is possible to narrow the interval between the protrusions of a moth-eye structure.

Moreover, the relationship between the shifting distance of the peripheral direction per shot or the shifting distance of the radial direction and the spot interval is not limited to the above. When two spots among the plurality of spots exposed with one shot are aligned in the shifting direction, multilayer exposure is possible so as long as the shifting distance per shot possesses a relationship of 1/positive integral number against the distance between such two spots. Here, 1/positive integral number means ½, ⅓ and so on.

For example, as shown in FIG. 10(a), when the shifting distance per shot is set to ⅓ of the spot interval, multilayer exposure is possible.

When it is not necessary to perform multilayer exposure, the relationship between the shifting distance of the peripheral direction per shot or the shifting distance of the radial direction and the spot interval can be set even more freely. For example, FIG. 10(b) is a diagram showing a case where the shifting distance of the radial direction per one round of exposure illustrated in a part of FIG. 10(a) is set to ⅔ of the spot interval. In the diagram, after the one round worth of exposure shown with "1", exposure of "2" is conducted upon shifting ⅔ of the spot interval in the radial direction. Then, exposure of "3" is further conducted upon shifting ⅔ of the spot interval in the radial direction. When this is repeated, multilayer exposure is not performed between the respective rounds, and the overall appearance of the original plate is as depicted in FIG. 12(d).

Figure 11:
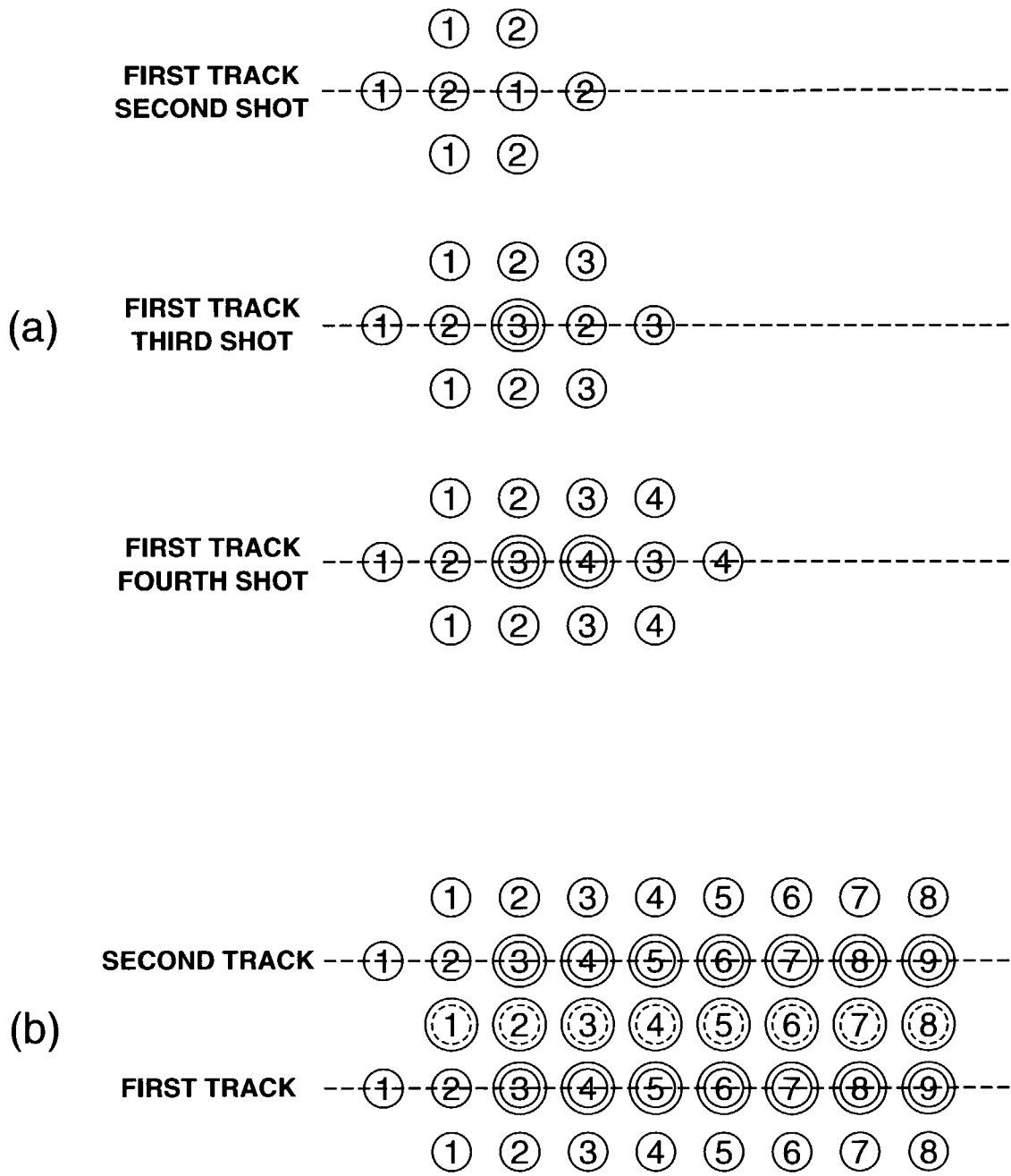
FIG. 11 is a diagram showing another example of multilayer exposure.

Further, FIG. 11 illustrates another method of multilayer exposure. In this example, the four beams are disposed in a diamond shape to form a spot set.

With the example shown in FIG. 11(a), the four beams are disposed in a diamond shape, and, although it appears that three tracks are formed upon exposure, only the middle spot is multilayer exposed among such three tracks. The point represented with a solid line double circle in the diagram corresponds to such middle spot.

Moreover, as shown in FIG. 11(b), in the second track, one outer spot of the first track is overlapped with one inner spot of the second track. The double circle points represented with a solid line and dotted line correspond to the above. This process may be repeated to realize multilayer exposure.

Figure 13:
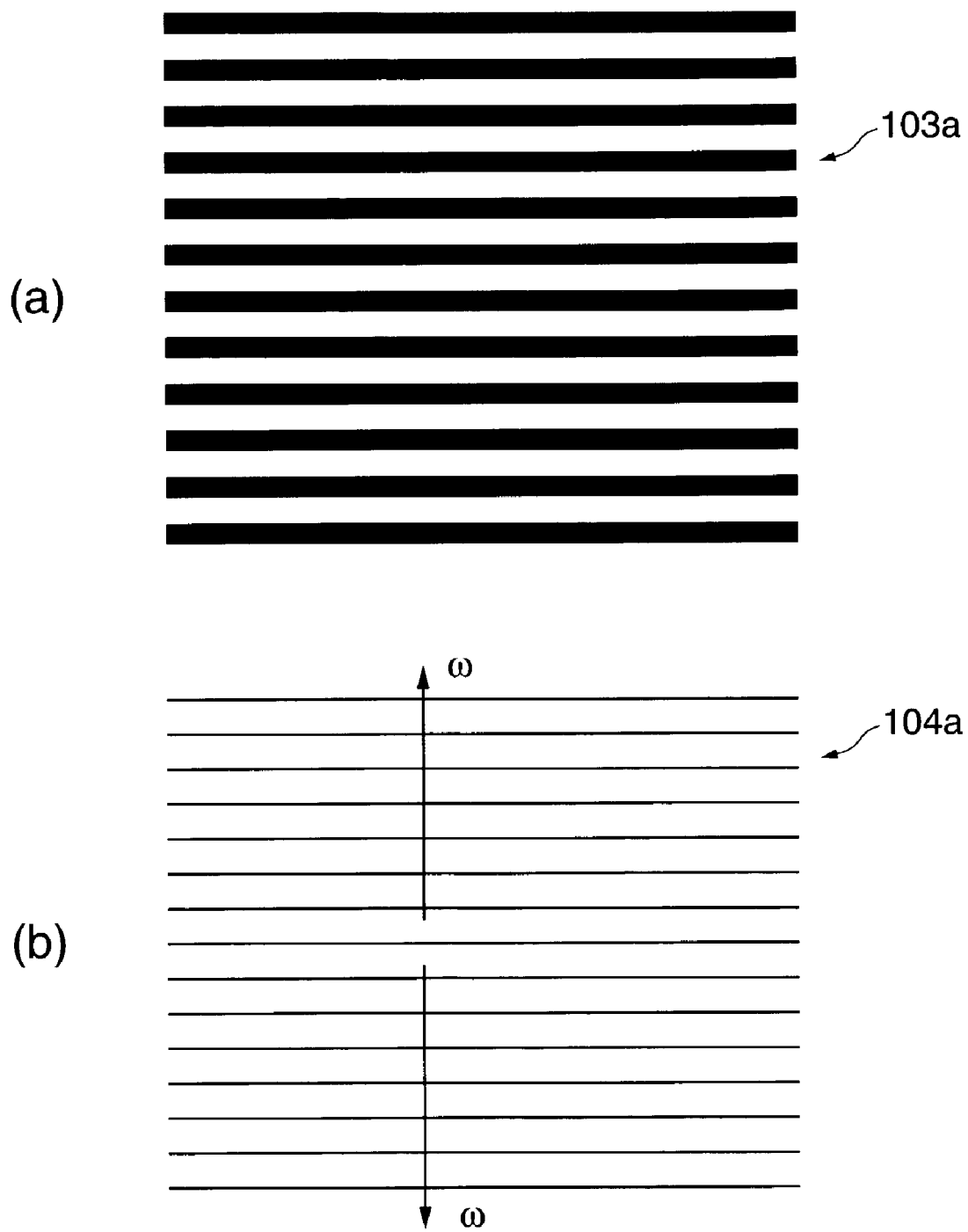
FIG. 13 is a diagram showing an example of another diffraction grating.

FIG. 13 is a diagram showing another example using a spot set pursuant to two beams. In this example, instead of the checkerboard-patterned diffraction grating 103 (c.f. FIG. 2) and the blaze grating 104 (c.f. FIG. 4), strip-patterned phase-type diffraction grating 103a shown in FIG. 13(a) and a corresponding saw-shaped diffraction grating 104b shown in FIG. 13(b) may be used to parallel separate the beam 102 into two beams. The pattern cycle Pa of this stripe-patterned diffraction grating 103a is 18 μm. The saw-shaped phase-type diffraction grating 104a for paralleling is disposed after the AOM 102 for parallel separation into two beams.

When the exposure track pitch employing this spot set is set to 0.6 μm, the spot set trace becomes a double spiral shape similar to FIG. 12(a).

Further, when the track pitch is set 0.3 μm, which is the same as the spot interval of the spot set, and multilayer exposure is performed so as to overlap with the previous track, the spot set trace becomes a single spiral shape similar to FIG. 12(b).

Moreover, when the track pitch is set to 0.15 μm, which is half of the spot interval of the spot set, the track pitch is multilayer exposed similar to FIG. 12(c), and the interval of the protrusions of the moth-eye structure can be narrowed. In addition, when exposing in the pulse shape with the beam spot set, it is possible to form a round pore (hole) shape. When continuously exposing with a beam spot set, it is further possible to form a groove shape.

Figure 14:
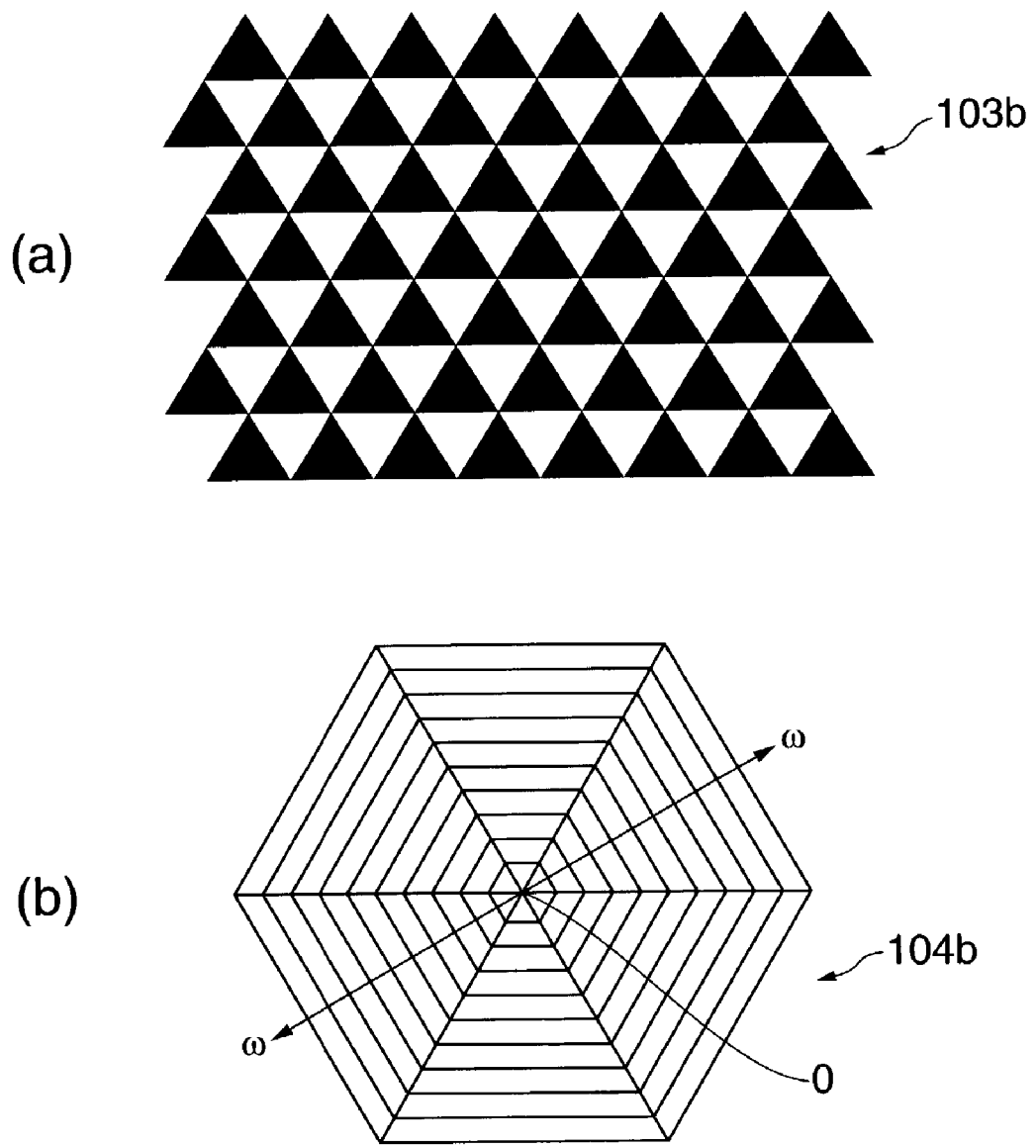
FIG. 14 is a diagram showing an example of yet another diffraction grating.

FIG. 14 is a diagram showing an example of using a spot set pursuant to six beams. Instead of the diffraction gratings 103, 104, the phase-type diffraction grating 103b having an equilateral triangle shape shown in FIG. 14(a) and a six-region saw-shaped diffraction grating 104b shown in FIG. 14(b) are used. The beam 102 can thereby be parallel separated into six beams. Here, the positional relationship of the minute spots will become an equilateral hexagon shape.

Figure 15:
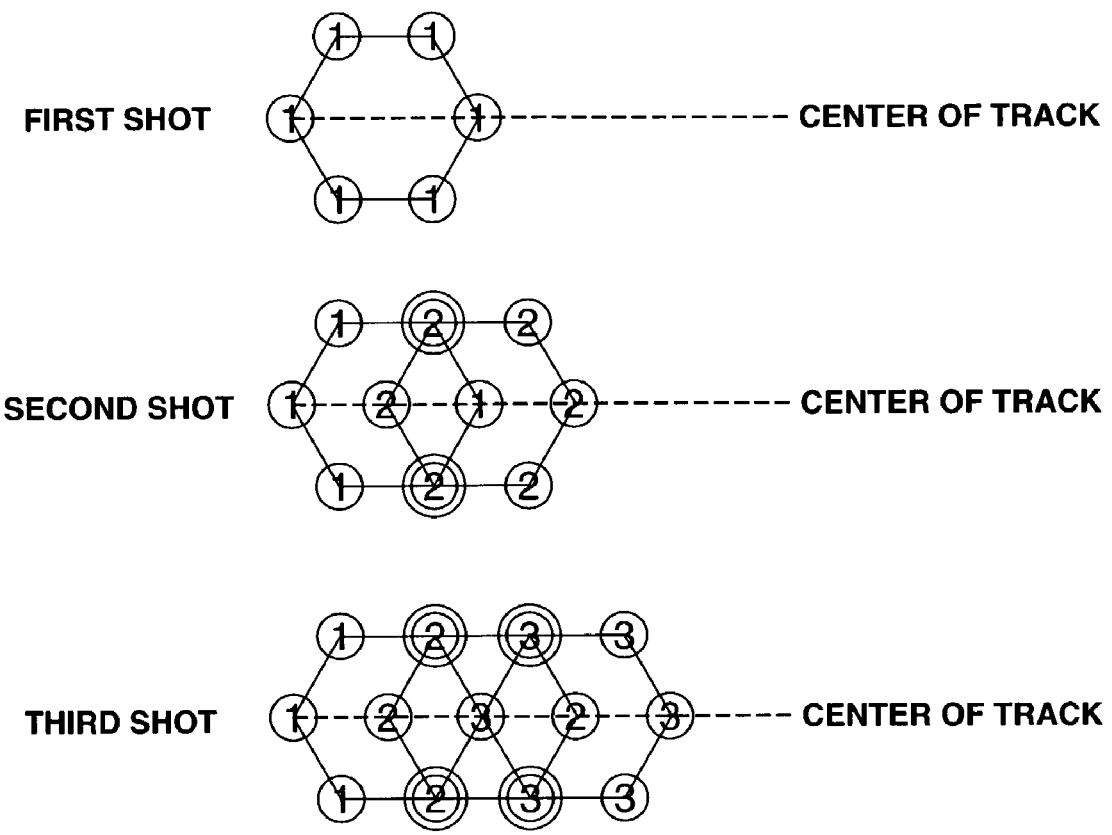
FIG. 15 is a diagram showing the exposure mode in the case of employing the diffraction grating illustrated in FIG. 14.

As shown in FIG. 15, by partially overlapping and performing multilayer exposure to the six spots disposed on the respective apexes of the equilateral hexagon, each position can be exposed twice.

Figure 16:
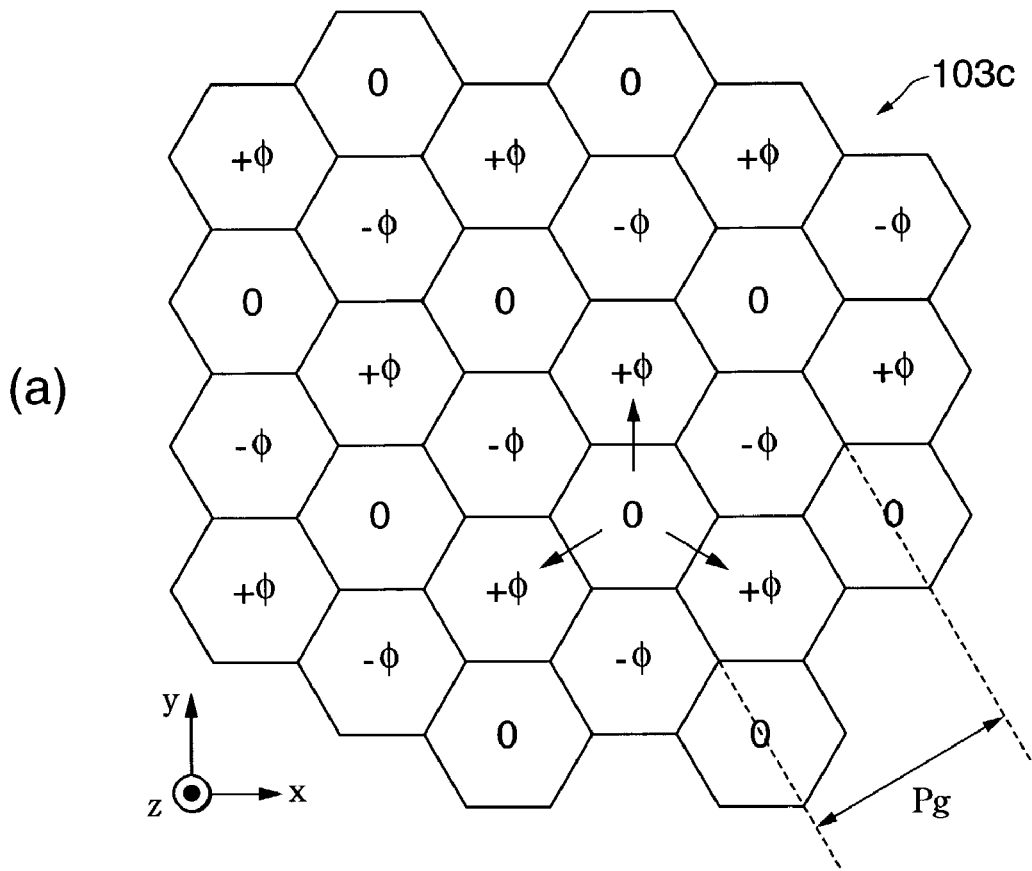
FIG. 16(a) is a diagram showing another pattern example of the first diffraction grating, which is a structural element of the optical system illustrated in FIG. 1, whereby
FIG. 16(b) is a diagram showing another pattern example of the second diffraction grating, which is a structural element of the optical system illustrated in FIG. 1.
Figure 16:
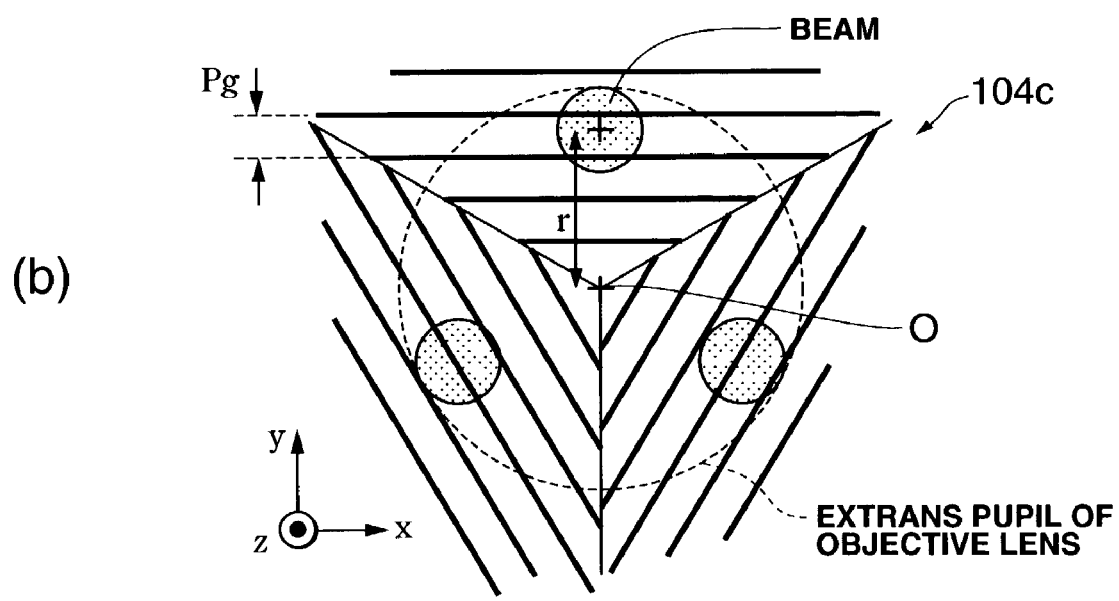

FIG. 16 is a diagram showing an example using a spot set pursuant to three beams. In this example, diffraction gratings 103c and 104c are used instead of diffraction gratings 103 and 104.

As shown in FIG. 16(a), the grating pattern of the diffraction grating 103c is structured by a plurality of cells (unit areas) partitioned in equilateral hexagons of a honeycomb shape. Each cell, as shown in the diagram, is formed so as to generate one among the relative phase differences in three stages; namely, $-\phi, 0, +\phi$ (depth of three levels) against the transmitted light. Further, the adjacent cells are disposed such that they have different phase differences. In this example, since the level Q, which is the stage of phase difference, is set to 3, the maximum value $2\phi$ of the depth difference is $2\phi=4\pi/3$. The actual depth h corresponding to this $2\phi$ is represented with the following formula when the refractive index of the diffraction grating substrate is given as n, and the used light source wavelength is given as λ:

$$h=\lambda/2\pi(n-1)\times 2\phi.$$

When a single beam 101 is entered into the grating 103c satisfying the foregoing conditions, it is separated into three beams, and enters the diffraction grating 104c. The spots of the three beams on the diffraction grating 104c are respectively positioned on each apex of the equilateral triangle.

FIG. 16(b) is a diagram showing an example of the pattern of the diffraction grating 104c. As shown therein, the diffraction grating 104c is structured with three beams being aligned so as to rotate around an apex of one area of a fan shape having a center angle of 120 degrees. The cross section of the grating of each area is of a saw shape. The maximum depth of this shape is a phase difference of $2\pi$. The three optical beams entering this diffraction grating 104c enter the objective lens 105 as parallel light and form a spot set of three spots on the photo resist 108.

The grating cycle of diffraction grating 103c and diffraction grating 104c is represented by the following formula when the interval between diffraction gratings 103c and 104c is given as L, and the distance from the center of the objective lens 105 to the beam entering the objective lens is given as r;

$$Pg=\lambda/\sin(\tan^{-1}(r/L))\approx\lambda L/r.$$

Figure 17:
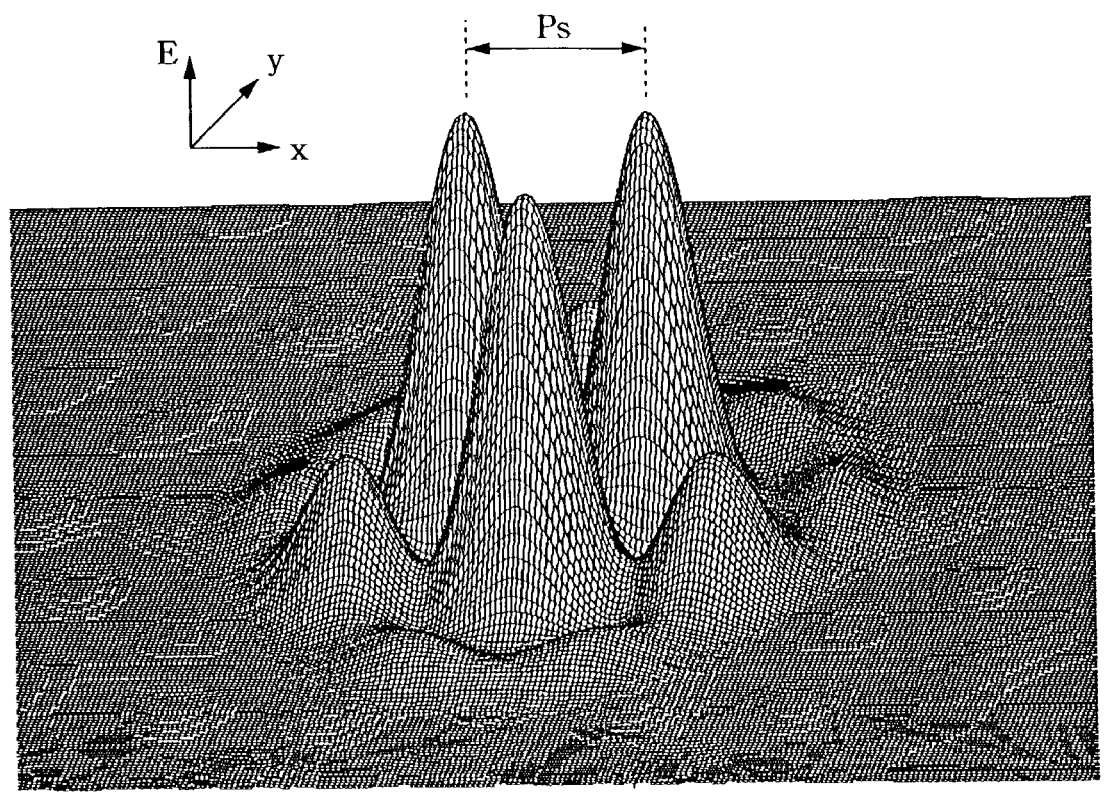
FIG. 17 is an explanatory diagram for explaining the exposure profile of the beam set when the phase difference between the spots is $\frac{2}{3}\pi$.

FIG. 17 is a diagram showing the beam profile of a spot set when the mutual phase difference of the three beams arriving at the photo resist layer 108 is set to become 120 degrees ($2\pi/3$). When the phase difference is $2\pi/3$, the beam spots are positioned at the respective apexes of the equilateral triangle, and a high peak characteristic of the exposure energy is depicted at such positions.

Figure 18:
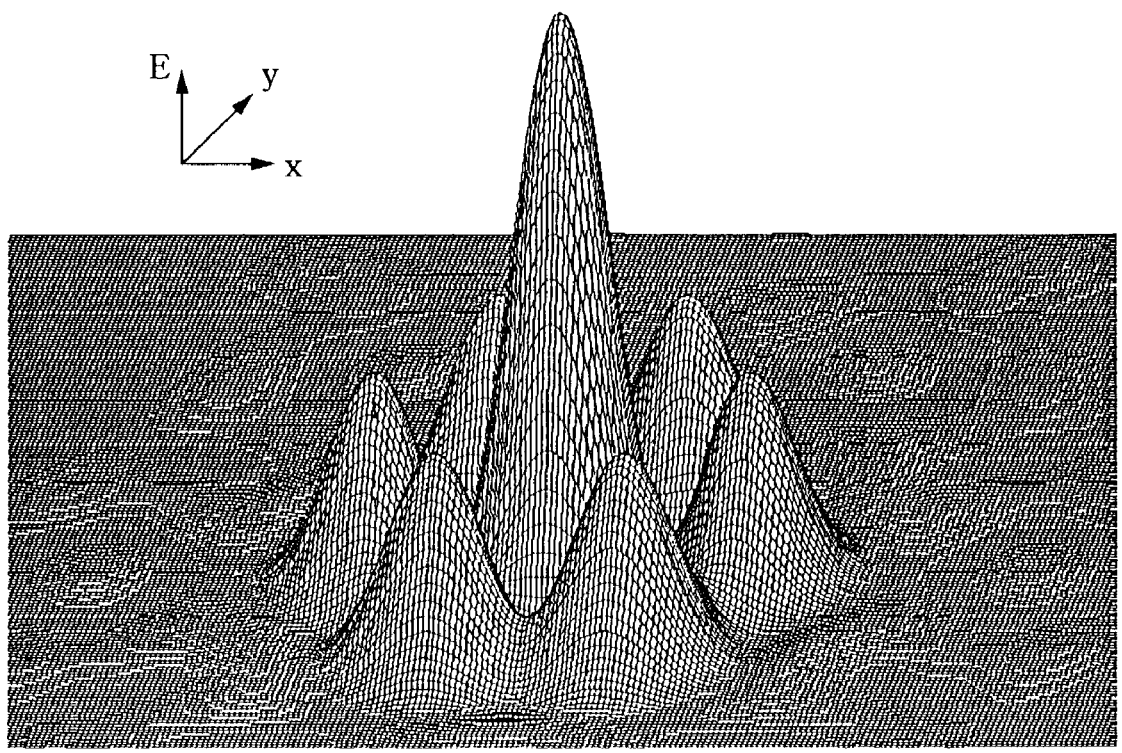
FIG. 18 is an explanatory diagram for explaining the exposure profile of the beam set when the phase difference between the spots is 0.

FIG. 18 is a diagram showing the beam profile of a spot set when the mutual phase difference of the three beams is set to 0. As shown in the diagram, the main peak of the exposure energy is positioned in the center of the hexagon and the sub peaks are positioned in the respective apexes of the hexagon in this profile. Since a beam profile changes pursuant to the phase difference of the three beams, in order to realize the profile shown in FIG. 18, it is necessary to accurately adjust the phase difference. As one means thereof, there is a method of adjusting the phase by shifting the diffraction grating 104c in the z direction and y direction. This utilizes the effect of the diffracting phase changing by adjusting the positional relationship of the diffraction grating 104c and the entering beam.

Figure 19:
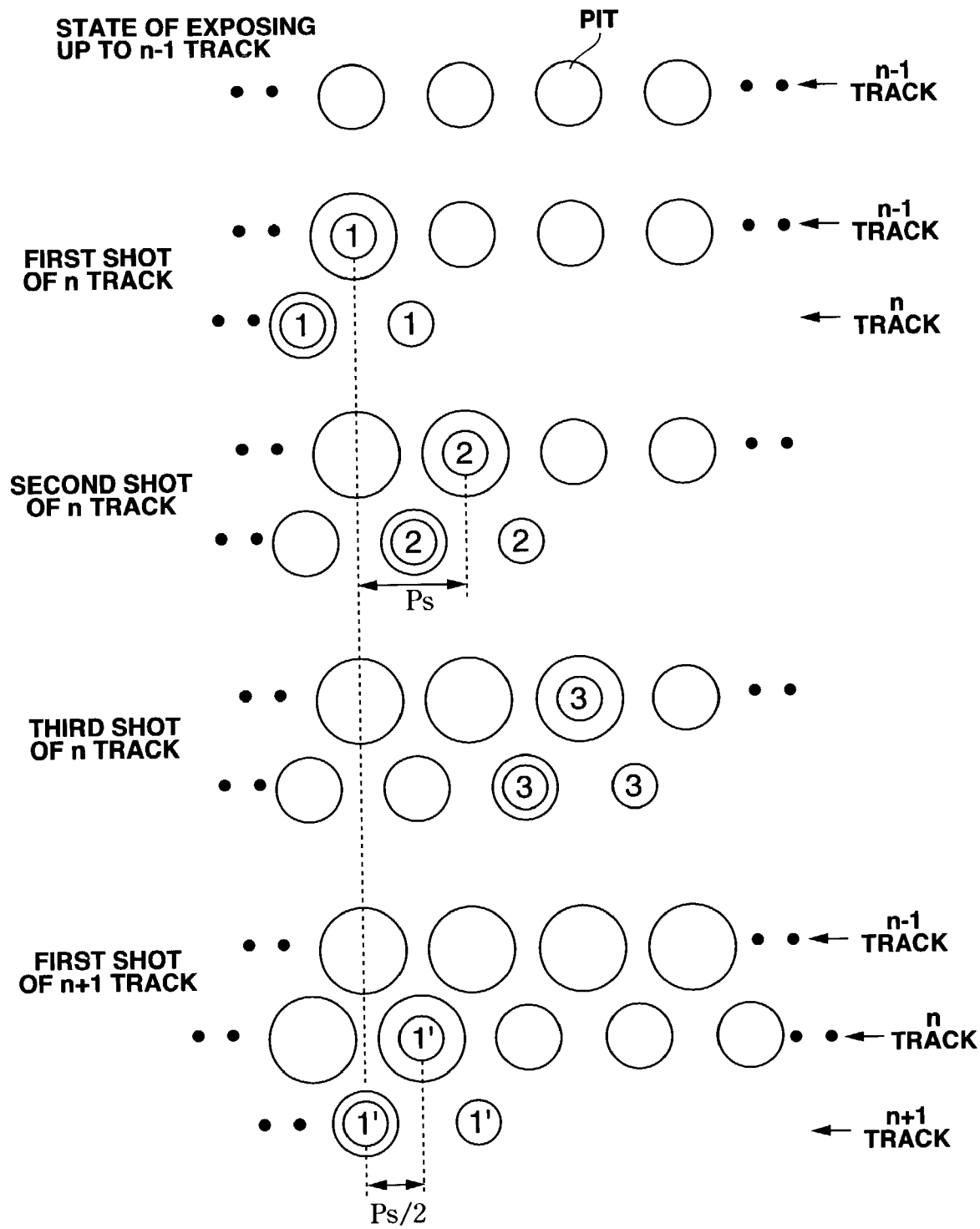
FIG. 19 is an explanatory diagram for explaining an example of manufacturing a structure of a round pore (hole) triangular grating sequence by employing three spot sets.

FIG. 19 is an explanatory diagram for explaining an example of manufacturing a structure of a round pore triangular grating sequence by employing the aforementioned three spot sets.

In this example, employed is a method where the optical intensity of the beam is intermittently modulated simultaneously with the perpendicular scan and rotational scan of the spot set. In a single scan trace (track), irradiation is conducted in a cycle Ps, and the track interval is $\sqrt{(3)}Ps/2$. Moreover, with the odd numbered tracks (e.g., n−1 track, n+1 track) and the even numbered tracks (e.g., n track), the spot set irradiation position is shifted half a cycle. This position shift is conducted with a control signal supplied from a pattern generation device not shown to the optical modulator 102.

Figure 20:
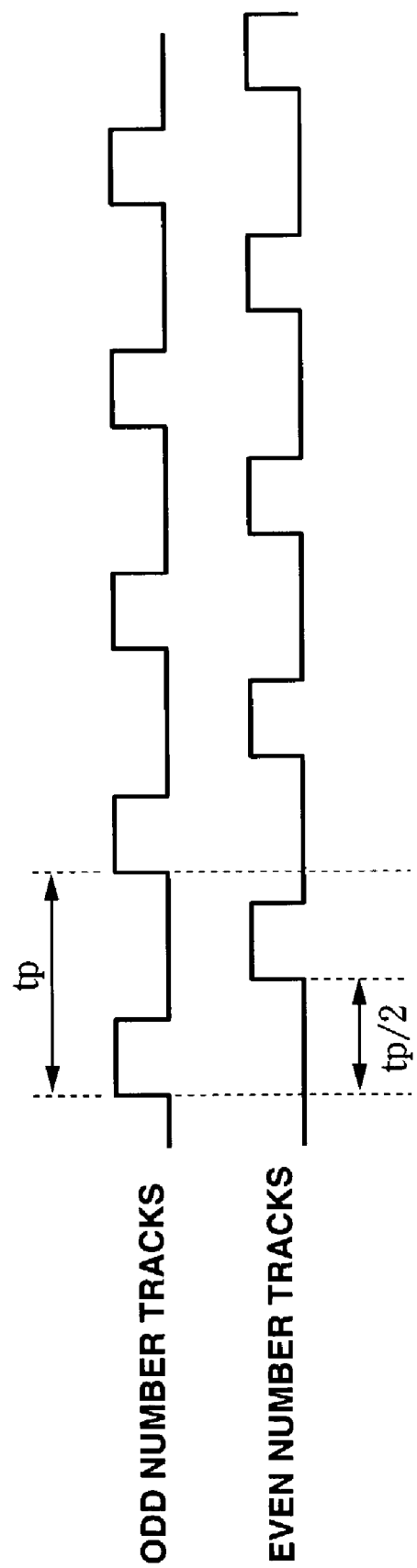
FIG. 20 is a signal waveform diagram for explaining an example of a modulation signal of an optical modulator.

FIG. 20 is a diagram showing the timing chart of a control signal supplied to the optical modulator 102. As shown therein, the control signal is established such that the shot timing for the odd-numbered tracks and even-numbered tracks will deviate a half cycle tp/2.

By exposing the spot set with the foregoing method, three spots will be multilayer exposed against one round pore, variances in the amount of exposure caused by the intensity distribution of the respective spots can be eliminated, and, as a result, an even round pore is formed.

The exposure method pursuant to a spot set or the multilayer exposure method described above is suitably selected to conduct exposure of the minute pattern. A latent image is formed by irradiating a laser pulse in an interval half of d, for example, in both directions of $\xi$ and $\eta$, on the surface of the photo resist 108. This is developed in order to form a convex or concave shape. The protrusion interval will thereby be 0.15 $\mu$m, and an antireflection effect can be obtained in approximately the entire visible region. Thereafter, the surface is made into a conductor, and electroforming is further conducted thereto in order to manufacture a mold with a thickness of 300 $\mu$m, and an antireflective plate can be mass produced by forming a resin from such mold.

Here, although the irradiated light effective in antireflection was visible light, for example, by adjusting incident angle $\theta$ of the beam, it is possible to change the beam interval d to correspond to the demanded wavelength band. In addition, the beam interval d can be changed by changing $\lambda$ with another wavelength of a laser suitable for exposure.

The aforementioned exposure method is applicable in the case of forming a photonic crystal pattern.

Figure 21:
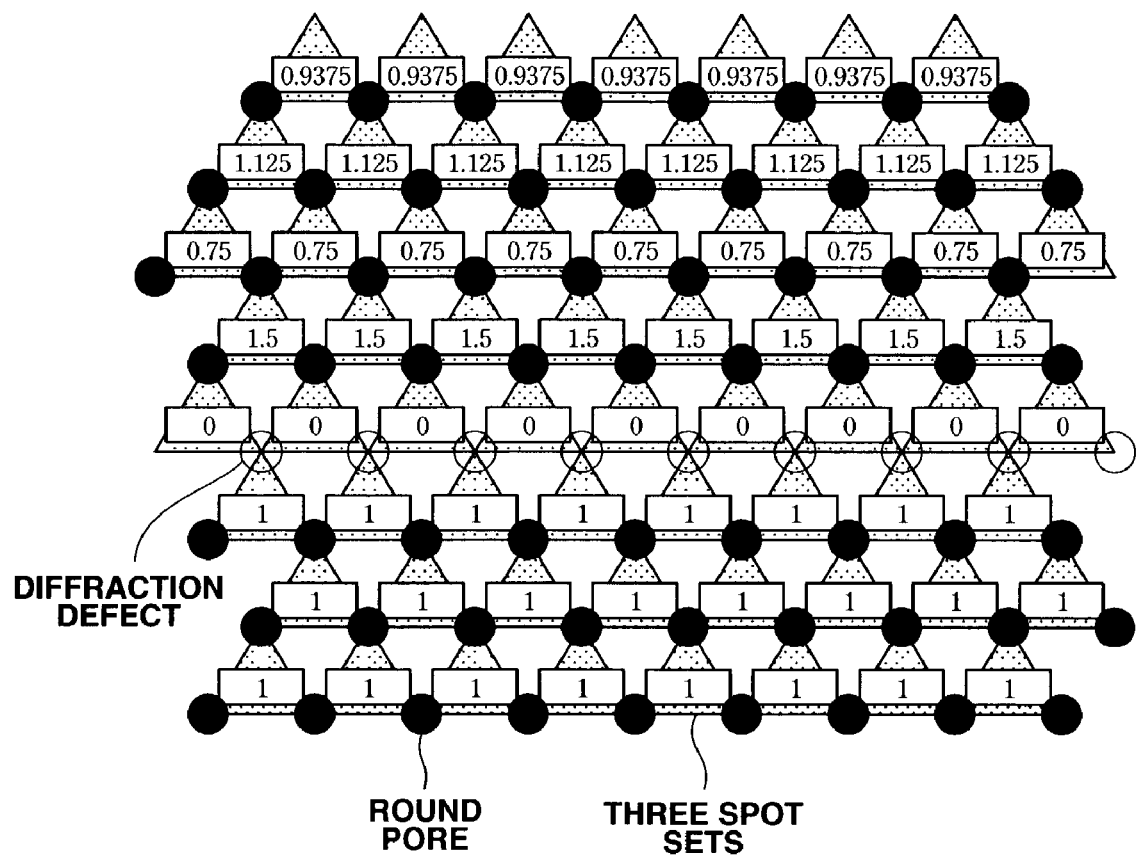
FIG. 21 is an explanatory diagram for explaining a pattern example of a photonic crystal.

For example, as shown in FIG. 21, considered is a case of forming one row of a grating defect in which a round pore is not formed thereon in a round pore triangular grating sequence of the same size. The spot set is represented with the shaded equilateral triangles. When forming an even round pore grating, an even amount of exposure will suffice. When forming a grating defect, however, this is realized by adjusting the amount of exposure in accordance with the irradiation position. The relative amount of exposure pursuant to multilayer exposure in the respective equilateral triangles is shown in the diagram. There are three spot irradiations at each round pore, and the sum of the amount of exposure at the grating defect portion is 1, and the remainder is 3.

Figure 22:
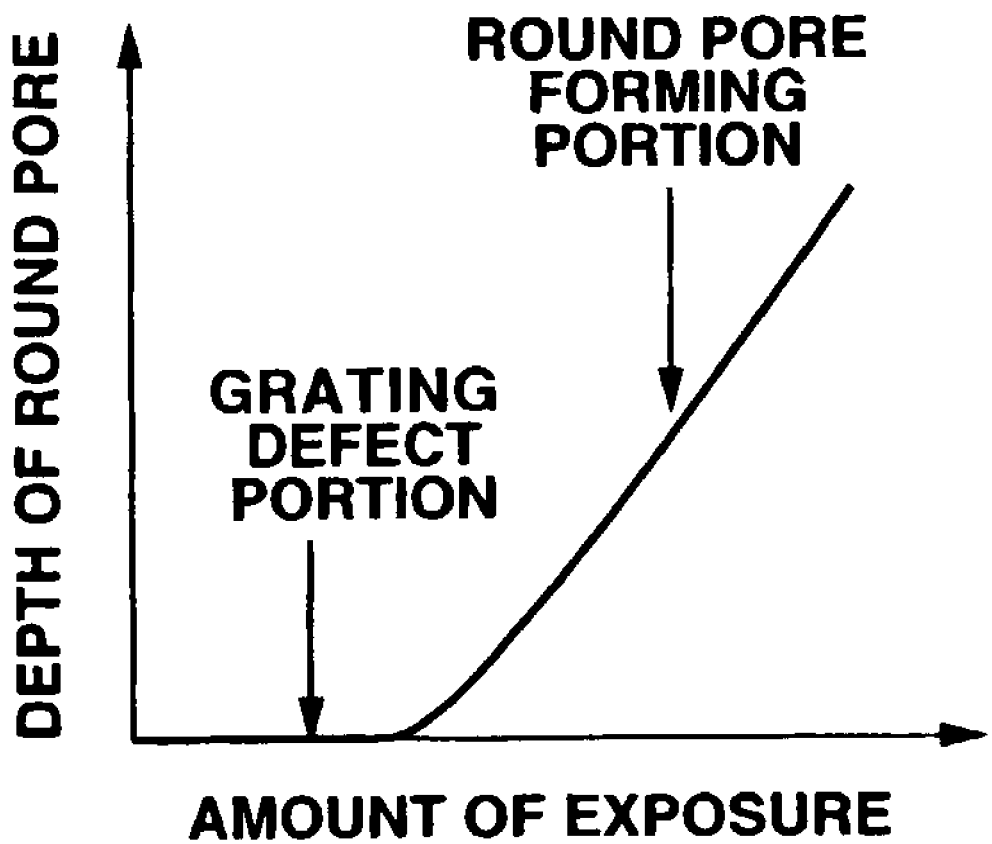
FIG. 22 is an explanatory diagram for explaining the characteristic examples of photosensitive materials.

Here, by utilizing the nonlinearity of the sensitivity of the photosensitive material (photo resist) shown in FIG. 22, the amount of exposure at the grating defect portion becomes 1, the round pore depth becomes 0, and a round pore is not formed. This type of photonic crystal patterning may be used for creating various optical factors such as optical guides and optical wavesplitters. Further, such optical factors can be used in optical telecommunication devices, optical information processing devices, optical information storage devices, and so on.

The aforementioned manufacturing method of microstructures is applicable to the manufacture of microstructures of various electronic components and devices. Further, the microstructure obtained pursuant to this manufacturing method may be employed in various electronic components and devices.

Figure 23:
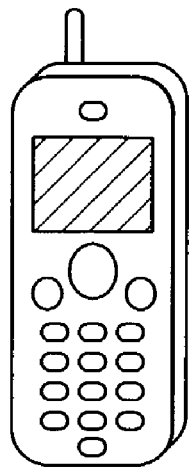
FIG. 23 is an explanatory diagram for explaining applications of the present invention.
Figure 23:
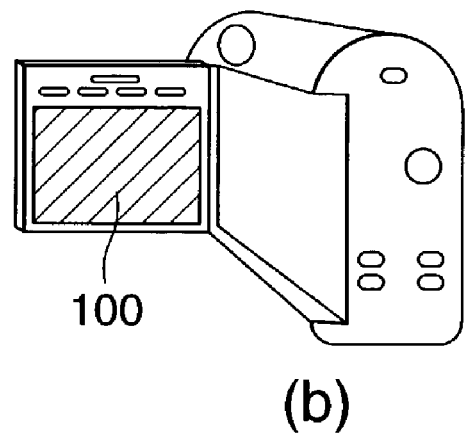
Figure 23:
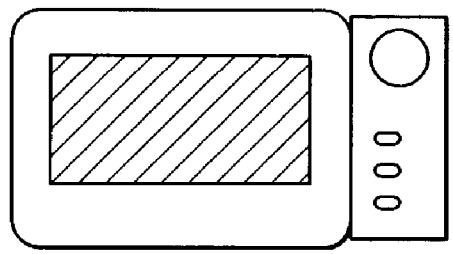

For example, as shown in FIG. 23, it is preferable that the manufacturing method of microstructures is applied to the constitution of microstructures in liquid crystal devices, organic EL devices, display devices including such devices; electronic devices such as imaging elements (devices); portable telephones, portable information devices, and so on, such as in forming a concave/convex groove in the reflective plate for reflective liquid crystal display devices.

Further, although two types of diffraction gratings were made to be parallel and flat in the present embodiment, the present invention is not limited thereto, and two types of diffraction gratings may be formed on both sides of a single parallel flat plate.

As described above, according to the present invention, since a beam is branched into a plurality of branches with the diffraction grating, a plurality of spots, which are smaller than the laser wavelength to be used, can be formed through the interference of such beams. A microstructure moth-eye can thereby be easily formed.

Moreover, even if the power of each beams varies upon branching the beam with a diffraction grating, the exposure power of the respective spot positions can be made even with the application of multilayer exposure to the minute spots. It is thereby possible to evenly form a microstructure such as a moth-eye shape. The antireflection effect of the moth-eye is thereby improved.

Further, by making the shifting distance per shot or per round of the spot set shorter than the spot interval, the protrusion interval of the moth-eye structure can be narrowed, and it is thereby possible to create elements possessing an antireflection effect against light of a shorter wavelength.

In addition, this is convenient in that the complex adjustments of the optical system of exposure devices can be alleviated.

What is claimed is:

1. A manufacturing method of a microstructure, comprising:
    a spot set forming step for obtaining a spot set formed of a plurality of minute spots from a laser beam or an electron beam, said laser beam or said electron beam generated by a phase-type diffraction grating branching device including a plurality of types of phase shift areas having different phase shift quantities against said laser beam or said electron beam; and
    an exposure step for forming an irradiation trace by irradiating said spot set a plurality of times while changing the irradiation position of said spot set against a process target material,
    said exposure step performing multilayer exposure by overlapping a part of a plurality of irradiation traces pursuant to a single spot set and a part of a plurality of irradiation traces pursuant to another spot set.

2. A manufacturing method of a microstructure according to claim 1, said spot set forming step including:
    a branching step for branching a single beam into a plurality of beams; and a condensing step for condensing said plurality of beams to said process target material.

3. A manufacturing method of a microstructure according to claim 1, said spot set forming step including:
   a branching step for branching a single beam into a plurality of beams;
   a parallel step for making said plurality of beams mutually advance in parallel; and
   a condensing step for condensing said plurality of beams to said process target material.

4. A manufacturing method of a microstructure according to claim 1, said single spot set and said another spot set being spot sets adjacent in the shifting distance of said irradiation position.

5. A manufacturing method of a microstructure according to claim 1, said single spot set and said another spot set being spot sets adjacent in the perpendicular direction against the shifting distance of said irradiation position.

6. A manufacturing method of a microstructure according to claim 1, a spiral-shaped irradiation trace pursuant to a plurality of minute spots being formed by relatively shifting said spot set radially while rotating said process target material.

7. A manufacturing method of a micro structure according to claim 1, said plurality of minute spots being formed by employing a phase-type diffraction grating having at least one of a striped pattern, quadrangular, equilateral triangular or hexagonal phase shift area.

8. A manufacturing method of a microstructure according to claim 1, said process target material being a photosensitive material, and said irradiation trace being a latent image formed on said photosensitive material.

9. A manufacturing method of a microstructure according to claim 1, said irradiation trace being a laser ablation.

10. The method of claim 1, the beam being light beams, and the diffraction grating producing interference of the beams.

* * * * *